US008358347B2

(12) United States Patent
Voltz

(10) Patent No.: US 8,358,347 B2
(45) Date of Patent: Jan. 22, 2013

(54) FRAME RATE MEASUREMENT

(75) Inventor: Christopher D. Voltz, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 199 days.

(21) Appl. No.: 12/858,203

(22) Filed: Aug. 17, 2010

(65) Prior Publication Data
US 2012/0044359 A1 Feb. 23, 2012

(51) Int. Cl.
*H04N 17/00* (2006.01)
(52) U.S. Cl. .......................... 348/189; 348/181; 348/180
(58) Field of Classification Search .................. 348/189, 348/180, 181; 382/100, 168, 194; 386/239, 386/241, 260
See application file for complete search history.

(56) References Cited

U.S. PATENT DOCUMENTS

| | | | | |
|---|---|---|---|---|
| 2,632,058 A | | 3/1953 | Gray | |
| 5,896,170 A | * | 4/1999 | Webb et al. | 348/190 |
| 6,108,447 A | * | 8/2000 | Lord et al. | 382/232 |
| 6,462,785 B1 | * | 10/2002 | Carraro et al. | 348/578 |
| 2005/0093803 A1 | * | 5/2005 | Cheon et al. | 345/92 |
| 2010/0265344 A1 | * | 10/2010 | Velarde et al. | 348/208.16 |
| 2010/0315435 A1 | * | 12/2010 | Ishida et al. | 345/634 |
| 2011/0228972 A1 | * | 9/2011 | Nakamura et al. | 382/100 |

OTHER PUBLICATIONS

"Motion"; http://www.lavrsen.dk/twiki/bin/view/Motion/WebHome; 1999-2010.

* cited by examiner

*Primary Examiner* — Lin Ye
*Assistant Examiner* — Euel Cowan

(57) ABSTRACT

A method and system of measuring a frame rate with an imaging device may include, capturing images of a number of frames of at least a portion of a series of frames output on a display device, determining if consecutive images of the captured images are different.

23 Claims, 6 Drawing Sheets

FRAME RATE MEASUREMENT

BACKGROUND

Developments in the production and display of video content have lead to an ever-increasing desire to improve the way in which video content is presented on a display device. Developments have been made in display devices such as liquid crystal displays (LCD's), plasma displays, high-definition televisions, and cathode ray tube (CRT) displays in order to improve the appearance of displayed images.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
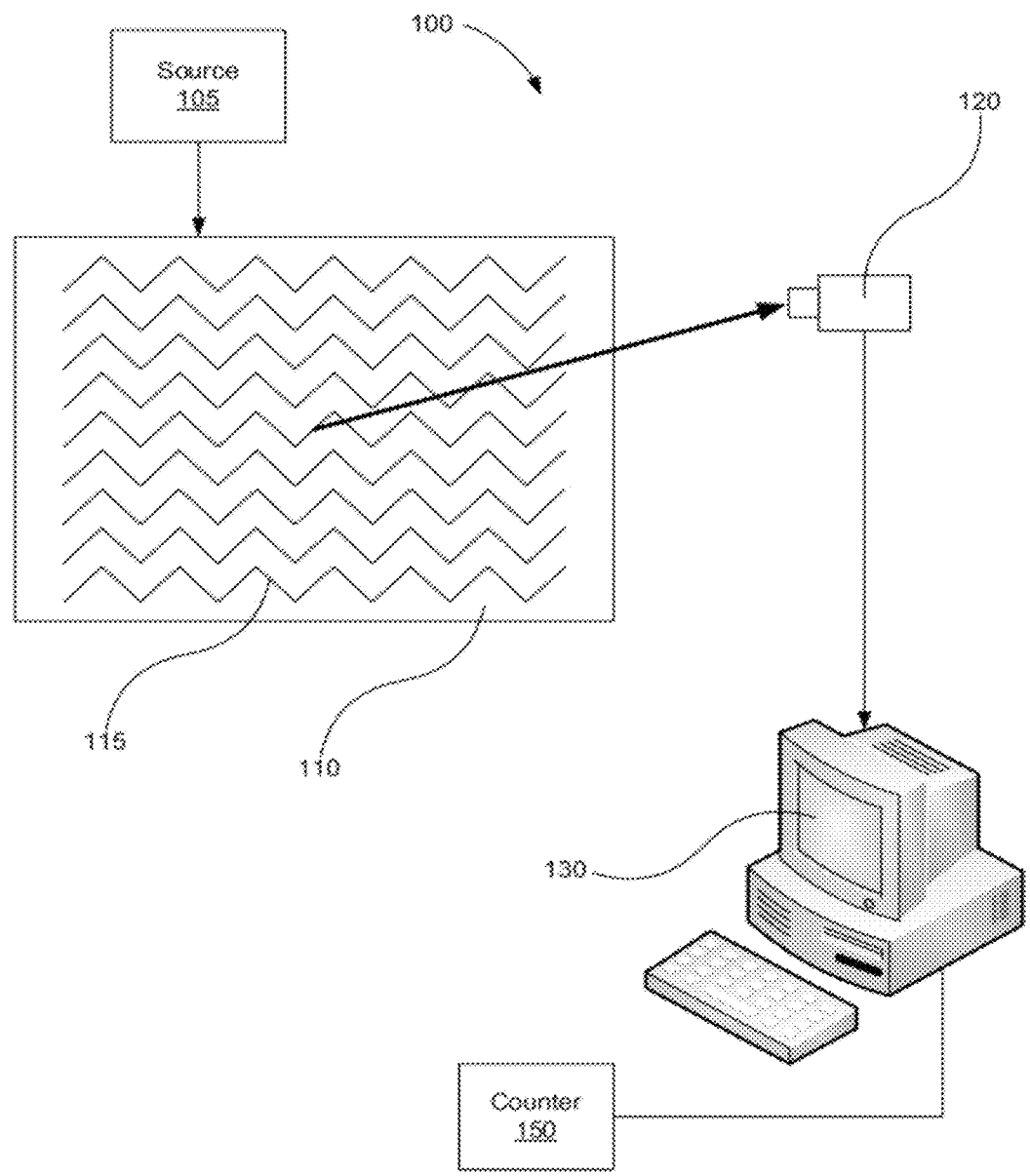
FIG. 1 is a block diagram of one example of a system for measuring video frame rates, according to an embodiment of the principles described herein.

Frame rate is an important variable in quantifying the performance of a video display system. Frame rate is the number of frames per unit time that are displayed by the system. Various embodiments of the principles described herein provide for measurement of a frame rate of a video signal provided by a video source or of video frame rates output on a display device. An imaging device or frame grabber is provided to capture a number of frames of the output of the source or display device. By dividing the number of different frames captured by the imaging device or frame grabber by the duration or elapsed time of the streaming video, the frame rate of the source or display device may be measured.

It is difficult to measure the video performance of applications running in a networked environment (for example, on a virtualized host or in a client/server configuration) when the application is designed to run as a local application. For example, in a computing system, a user can playback a locally-stored video clip or run a local application which renders 3D images in real-time. Using software which intercepts calls to the operating system, it is possible to accurately determine the rate at which frames are updated in these local operations. For example, using FRAPS®, a video capture utility which uses application programming interfaces (APIs) provided for handling tasks related to multimedia, it is possible to accurately determine the rate at which frames are updated.

Outside of the local computing context, issues arise in measuring frame rates. For example, when an application that is producing video is run in a virtualized computer, the reported frame rates may be inaccurate because of the lack of correlation between the virtual computer's time and actual time. In a networked environment, if the same application is run on a server and a remote client is used to display the output, some mechanism is used to move rendered video from the server to the client. However, it is often not possible to access the internals of that mechanism to determine which frames were transferred. Since implementations of such a mechanism will usually drop frames, measured frame rates on the server do not correlate to what is actually displayed on the client. Additionally, because the servers are commonly implemented as virtual servers, the inaccuracy of measuring the frame rate is compounded.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

As used in the present specification and the appended claims, the term "frame rate" is meant to be understood broadly as the number of frames of a series of frames which are displayed on a display device in a predefined amount of time, or the frequency at which individual frames are displayed. Frame rate is measured in, and may be expressed in units of frames per second (fps). A frame rate of 30 fps is often referred to in the art as "real-time speed of video" because it has a high enough frame rate that the video appears smooth to the human eye. However, 24 fps is considered sufficient for film. In many cases, 16 fps is sufficient for viewing without producing detectable frame transitions. At a slower frame rate of 12-15 fps, video and film may appear choppy to the human eye if objects are moving in the scene.

Further, as used in the present specification and the appended claims, the term "image" is meant to be understood broadly as any representation of an object in any form, including, for example, data or film. Further, as used in the present specification and the appended claims, the term "frame" is meant to be understood broadly as a single complete still image in a sequence of images that creates the illusion of motion within a scene when displayed in rapid succession (for example, streamed). "Frame" may also be used to refer to digital information representative of the single still image.

Still further, as used in the present specification and the appended claims, the term "imaging device" is meant to be understood broadly as any device configured to capture images. Such imaging devices may include, for example, a camera, a video camera, web camera, a frame-grabber, or a photodetector, among others.

Even still further, as used in the present specification and the appended claims, the term "display device" is meant to be understood broadly as an output device configured to output data for visual reception. Such display devices may include, for example, liquid crystal displays (LCD's), light-emitting diode (LED) displays, organic light emitting diode (OLED)

displays, plasma display panels, televisions, computer monitors, high-definition televisions, and cathode ray tube (CRT) displays, among others.

Turning now to FIG. 1, a diagram of one example of a system (100) for measuring video frame rates, according to an embodiment of the principles described herein is depicted. The system (100) may comprise a source (105), and a display device (110) configured to display a number of frames (115) based on data input from the source (105). The system (100) may further comprise an imaging device or frame grabber (120) configured to capture a number of frames (115) displayed on the display device (110). The imaging device or frame grabber (120) may be in communication with to a computing device (130), in which the computing device (130) is configured to process the frames (115) captured by the imaging device or frame grabber (120). Additionally, the system (100) may comprise a counter (150) for use by the computing device (130) in counting the number of different frames output by the display device (110) and captured by the imaging device or frame grabber (120). Each of these elements will now be discussed in more detail below.

The source (105) may be any device configured to provide video content in the form of data to the display device (110), and may include, for example, a personal computer, a thin client, a workstation, a server, a television program provider, and combinations thereof, among others. The frame rate of the original video content may be significantly altered from that which is eventually displayed on the display device (110). This may be due to the fact that the original video content is often subject to compression, decompression, coding, decoding, and other forms of processing by various hardware and software elements such as processors, network elements, memory elements, operating systems, and application programs. These hardware and software elements affect the original video content through their CPU speed, network parameters such as bandwidth, latency, and errors, available memory, and type of operating system. Therefore, it is often undetermined how these various networked elements affect the frame rate of the original video content at the source and at the display device (110).

The source (105) may be configured to provide any form of streaming digital or analog data. The data transmitted by the source (105) may be provided for the purpose of determining the frame rate output by the display device (110) or the source itself after the data has been rendered, compressed, sent over a network to a receiver, decoded, and output to the display device (110). In one example, the data transmitted by the source (105) is data that is not compared to the actual output frame rate of the display device (110) captured by the imaging device or frame grabber (120). In another example, the data transmitted by the source (105) is data provided and known by a user with the intention that original frame rate of the transmitted data is compared to the actual output frame rate of the display device (110) captured by the imaging device or frame grabber (120). These embodiments will be described in more detail below.

The display device (110) may be for example a liquid crystal display (LCD), a light-emitting diode (LED) display, an organic light emitting diode (OLED) display, a plasma display panel, a television, a computer monitor, a high-definition television, or a cathode ray tube (CRT) display, among others. In one example, the display device (110) may be a display device that uses a technology that does not require the display to be continuously updated; for example, an LCD display.

A CRT based display, however, is a display device that is continuously updated. The principles described herein could be extended to support such display devices by genlocking the imaging device or frame grabber (120) to the vertical synchronization signal of the CRT display device (110). Genlock (generator lock) is a technique where the video output of one source, or a specific reference signal, is used to synchronize other television picture sources together. To allow for a display device (110) to display an image properly, a standard component video signal comprises horizontal, vertical, frame, and color components (RGB). Genlock synchronizes the vertical, horizontal, frame, and/or color components of the signal. Thus, by genlocking the source (105) with the imaging device or frame grabber (120), a CRT based display may also be utilized. However, in another example, a CRT based display may still be used without genlocking the source (105) with the imaging device or frame grabber (120).

As mentioned above, the imaging device or frame grabber (120) is configured to capture the number of frames (115) displayed on the display device (110). The imaging device or frame grabber (120) may be configured to capture images at a high rate of frame acquisition. In one example, the frame acquisition rate of the imaging device or frame grabber (120) may be based on the frequency in frames per second (fps) attributed to the data input from the source (105). In one example, the imaging device or frame grabber (120) is configured to provide a frame acquisition rate that is at least twice the frame rate to be measured (that is, the actual output frame rate of the display device (110) or the frame rate of the data output from the source (105)). In other embodiments, the frame acquisition rate may be at least three to five times the frame rate to be measured. In other embodiments, the frame acquisition rate of the imaging device or frame grabber (120) may be at least 48 fps for data output from the source (105) comprising an output frame rate of 24 fps, at least 60 fps for data output from the source (105) comprising an output frame rate of 30 fps, or at least 120 fps for data output from the source (105) comprising an output frame rate of 60 fps.

The imaging device or frame grabber (120) may be, for example, a camera, a video camera, a web camera, a frame-grabber, or a photodetector. In one example, the imaging device or frame grabber (120) is a web camera. In another example, the imaging device or frame grabber (120) may be a photodiode, a photodetector, a photosensor, a light emitting diode (LED), a charge coupled device (CCD), or a solar cell, among others. Further, the imaging device or frame grabber (120) may comprise arrays of photodiodes, photodetectors, photosensors, light emitting diodes (LEDs), charge coupled devices (CCDs), solar cells, or combinations thereof. In yet another example, the imaging device could be a frame-grabber electrically coupled directly to the output of the source. A frame grabber is any hardware, software, or combinations of hardware and software that capture individual, digital still frames from an analog video signal or a digital video stream.

Images captured by the imaging device or frame grabber (120) are sent to a computing device (130) in communication with the imaging device or frame grabber (120). The computing device (130), having memory and a processor (not shown), is configured to process the frames (115) captured by the imaging device or frame grabber (120). In processing the images, the computing device (130) is configured to distinguish between the images captured by the imaging device or frame grabber (120). In one example, the computing device (130) is configured to determine if two consecutive images captured by the imaging device or frame grabber (120) are different. In this manner, the frame rate output by the display device (110) can be determined by distinguishing the frames captured by the imaging device or frame grabber (120), incrementing a counter (150) when it is determined that two consecutive frames captured by the imaging device are different, and dividing the number indicated by the counter (150) by the duration (for example, in seconds) of the analyzed clip to obtain the frame rate output by the display device (110). The counter may be embodied as hardware, software, or a combination of hardware and software. In one example, the counter (150) is configured to reset the number of increments to zero for each new series of frames being analyzed.

The threshold level for detecting whether consecutive images are different may be selected based on the type of content, the image acquisition parameters of the imaging device or frame grabber (120), and the desired level of sensitivity to changes. In one example, the threshold is automatically selected based on these, and other parameters. In another example, the threshold may be set by a user of the system (100).

Several methods may be applied in determining if two consecutive images captured by the imaging device or frame grabber (120) are different. These include, for example, an absolute error (AE) count; a mean absolute error (MAE) algorithm; a mean squared error (MSE) algorithm; a peak signal-to-noise ratio (PSNR) algorithm; a root mean squared error (RMSE) algorithm; a normalized sum of squared differences (root mean squared error) (NRMSE) algorithm; a normalized cross correlation; a histogram comparison; a simple hash; by applying a discrete cosine transform (DCT) to the images and comparing the resulting frequency coefficients (both DC and AC), and combinations of these, among others. Each of these methods will now be described in more detail below.

The absolute error (AE) count method is a method of differentiating between two consecutive images. The method analyzes the images pixel by pixel to determine the number of different pixels within two consecutive frames, and performs such a comparison for each consecutive frame pair in the series of frames. In this embodiment, the images may need to be preprocessed (for example, low pass filtered, bit quantization, etc.) beforehand.

Another method of determining whether two consecutive images captured by the imaging device or frame grabber (120) are different is by using a mean absolute error (MAE) normalized. The MAE algorithm may be expressed as follows in Equation 1:

$$MAE = \frac{1}{N}\sum_{i=1}^{N} |x_i - y_i| \quad \text{(Equation 1)}$$

The MAE method has lower computational needs than the MSE described below.

The mean squared error (MSE) algorithm method is an industry standard method that is computationally demanding relative to the MAE method. The MSE algorithm may be expressed as follows in Equation 2:

$$MSE = \frac{1}{N}\sum_{i=1}^{N} (x_i - y_i)^2 \quad \text{(Equation 2)}$$

Next, the peak signal-to-noise ratio (PSNR) is also an industry standard method. The PSNR algorithm may be expressed as follows in Equation 3:

$$PSNR = 10\log_{10}\frac{L_2}{MSE} \quad \text{(Equation 3)}$$

where L is the dynamic range of the pixel values.

Root mean squared error (RMSE) algorithm may also be employed in determining whether two consecutive images captured by the imaging device or frame grabber (120) are different. The RMSE algorithm may be expressed as follows in Equation 4:

$$RMSE = \sqrt{\frac{\sum_{i=1}^{N} (x_i - y_i)^2}{N}} \quad \text{(Equation 4)}$$

Yet another method may include the use of a normalized sum of squared differences (root mean squared error) (NRMSE) algorithm. The NRMSE algorithm is an industry standard with a balance between accuracy and computational resource utilization. The NRMSE algorithm may be expressed as follows in Equation 5:

$$NRMSE = \frac{RMSE}{(x_{max} - x_{min})} \quad \text{(Equation 5)}$$

Other methods include employing a normalized cross correlation method. The normalized cross correlation method may be used to determine whether two consecutive images are different. A histogram comparison may also be relatively easy to perform, although it may be less accurate compared to other methods. Use of simple hash functions (for example, MD5, SHA) are computationally demanding, and may be subject to false matches due to hash collisions. Further, another method may include utilization of a wavelet transform algorithm or a Fourier transform algorithm. Additionally, a discrete cosine transform (DCT) may be applied to the images, and one may compare the resulting frequency coefficients (both DC and AC). As for the time-frequency transform algorithms such as the above-mentioned wavelet transform, Fourier transform algorithm, and DCT algorithm, the resulting coefficients of these algorithms may be compared in order to determine if consecutive frames are different.

Figure 2:
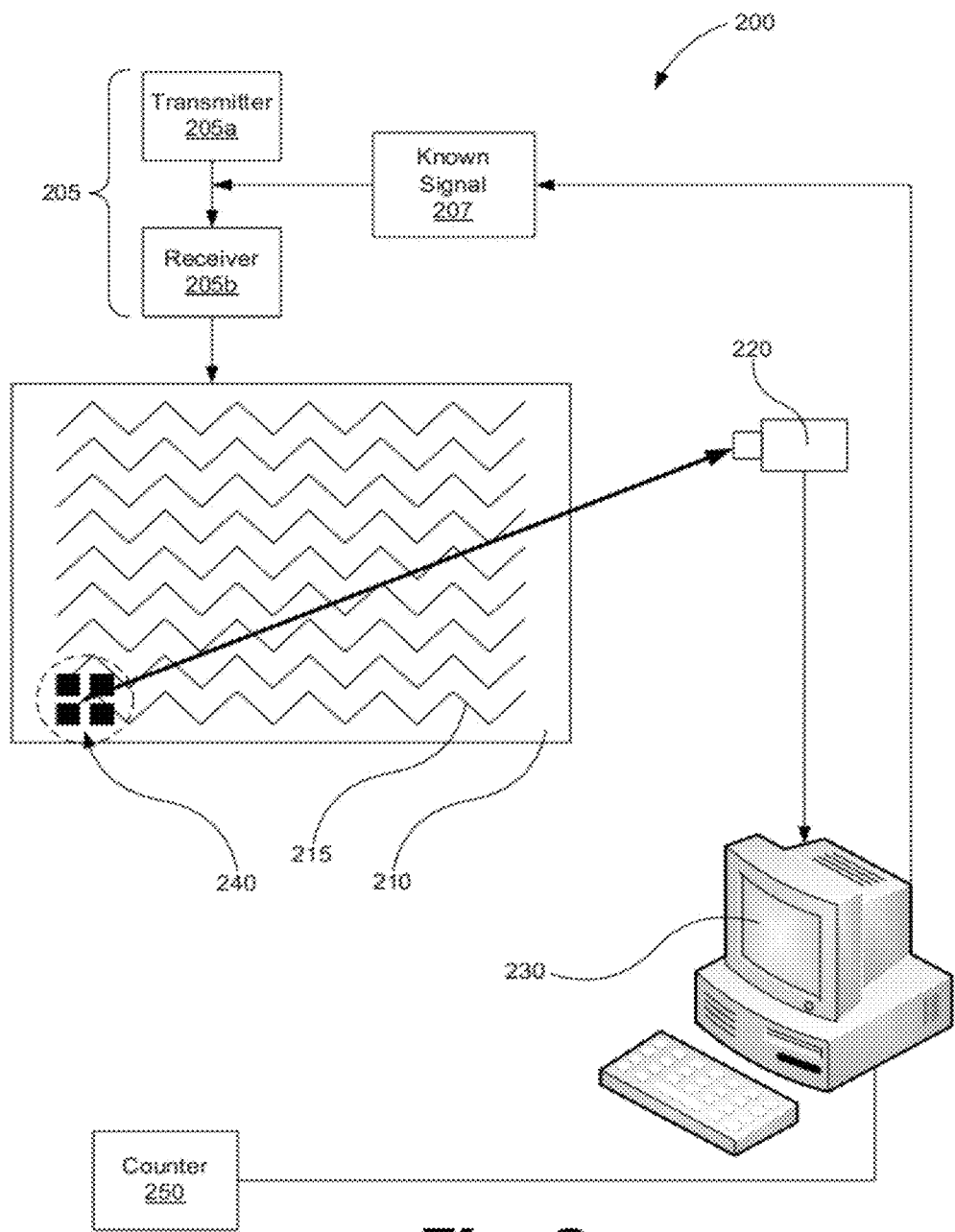
FIG. 2 is a block diagram of one example of a system for measuring video frame rates, according to another embodiment of the principles described herein.

Turning now to FIG. 2, a block diagram of one example of a system for measuring video frame rates, according to another embodiment of the principles described herein, is disclosed. The system (200) depicted in FIG. 2 may comprise a source (205), and a display device (210) configured to display a number of frames (215) based on data input from the source (205). The source (205) may comprise a transmitter (205a) and a receiver (205b). The receiver (205b) decompresses and renders the video or other data received from the transmitter (205a) and outputs it to the display device (210) for display. In one example, the receiver (205b) may be a thin client. The transmitter (205a) (for example, a server) provides video content to the receiver (205b). The receiver (205b) and transmitter (205a) may be incorporated into the same device, or may be separate devices operating on a network. In one example, the transmitter (205a) may be a server existent at a separate location from, and communicatively coupled to the receiver (205b) via a network.

The system (200) may further comprise an imaging device (220) configured to capture a number of frames (215) displayed on the display device (210), or, as described above, the imaging device (220) may be a frame-grabber configured to capture individual, digital still frames from the output of the source (205), and, more specifically, the receiver (205b). The imaging device (220) may be in communication with a computing device (230), in which the computing device (230) is configured to process the frames (215) captured by the imaging device (220). Additionally, in one example, the system (200) may comprise a counter (250) for use by the computing device (230) in counting the number of different frames output by the source (205), or the number of different frames output by the display device (210) and captured by the imaging device (220). In another example utilizing a frame-grabber, the system (200) may comprise a counter (250) for use by the computing device (230) in counting the number of different frames output by the source (205).

In FIG. 2 a test signal (207) is added along with the source (205), in which the test signal (207) is provided to the computing device (230). In this manner, the computing device (230) may provide the data that comprises the test signal (207). In other example, the test signal (207) may be provided by any other source including a computing device other than the computing device (230) depicted in FIG. 2 or a standalone pattern generator. The test signal (207) may be combined with the source (205) (for example, inserted into or overlaid onto the signal provided by the source (205)) in order to determine whether the source (205) and/or display device (210) drops a frame during display of the frames (215) that are based on the data input from the source (205). The system (200) can detect if one or more frames were dropped as will be discussed in more detail below.

The source (205) within the system (200) may provide any type of displayed content including 2D (for example, a presentation), and 3D applications with a test signal (207) added. For a situation where the source (205) is data relating to a 3D application (for example, animated film), incorporation of a test signal (207) can be performed by running an application on the processor (not shown) of the computing device (230) in which the computing device (230) generates a pattern which changes on each frame of the source (205).

The manifestation of the test signal (207) on the display device (210) may be a test pattern (240). In one example, the test pattern (240) may be four small rectangles configured to display a binary number (for example, a Gray code system) in a small portion of the display device (210). The test pattern (240) is synchronized to the vertical sync of the source (205). Thus, the changing of the test signal (207) (for example, changing of the test pattern (240)) would represent the frame rate of the source (205), as well as the fastest frame rate that the source (205) and/or display device (210) could possibly output. For example, the display device (210) may not be able to display all the frames provided by the source (205), and may drop a number of frames. Alternatively, in another example, the source (205) may drop a number of frames due to the rendering, compression, and transmission of the data representing the series of frames by the transmitter (205a), and the subsequent decompression and rendering of the series of frames by the receiver (205b). In these situations, the changing of the test pattern (240) will indicate whether any number of frames of the source (205) were dropped since the test pattern (240) would indicate the display of a non-consecutive frame. Although four small rectangles are depicted in FIG. 2, any type or form of test signal (207) may be incorporated with the source (205) other than the four rectangles of the present example.

Further, although more accurate frame rate calculations may be performed by providing for a different test pattern (240) for each frame, in one example, the test pattern (240) may be the same pattern for two or more frames. Further, the test signal (207) may apply a test pattern (240) to less than all the frames, or the same test pattern (240) may be applied to several consecutive or non-consecutive frames. In one example, the system is configured to detect changes in the test signal indicative of a change in frame.

If the source (205) comprises video content, the video content may be augmented with the test pattern (240) by preprocessing it with an application that processes the compressed video content, adds the test pattern, and saves the resultant bit stream. Depending on the device or computer program used to encode and decode (CODEC) the source (205), it is possible to add the test pattern without decompressing and recompressing the content. The application used to incorporate the test signal (207) into the source (205) may be embodied as hardware, software, or a combination of hardware and software.

In the embodiment depicted in FIG. 2, the imaging device (220) may be configured to capture only the manifestation of the test signal (207); that is, the test pattern (240). In one example, the test pattern (240) is manifested on a small portion of the display area of the display device (210). In this embodiment, the effect on the output frame rate and bit rate of the display device (210) would be insignificant. Further, since the test pattern (240) would be positioned at a known location on the display device (210), and would be relatively small, the imaging device (220) may be a lower resolution video acquisition system (for example, VGA instead of UXGA). In this manner, the image processing demands placed on the computing device (230) and the system (200) as a whole may be considerably reduced. This is because the images captured by the imaging device (220) are smaller, and the detection of individual frames may be reduced to simply looking for whether a given set of pixels are on or off. For example, this may be performed by using a simple threshold comparison of the average luminance value of the pixels in a given area of the display device (210).

Figure 3:
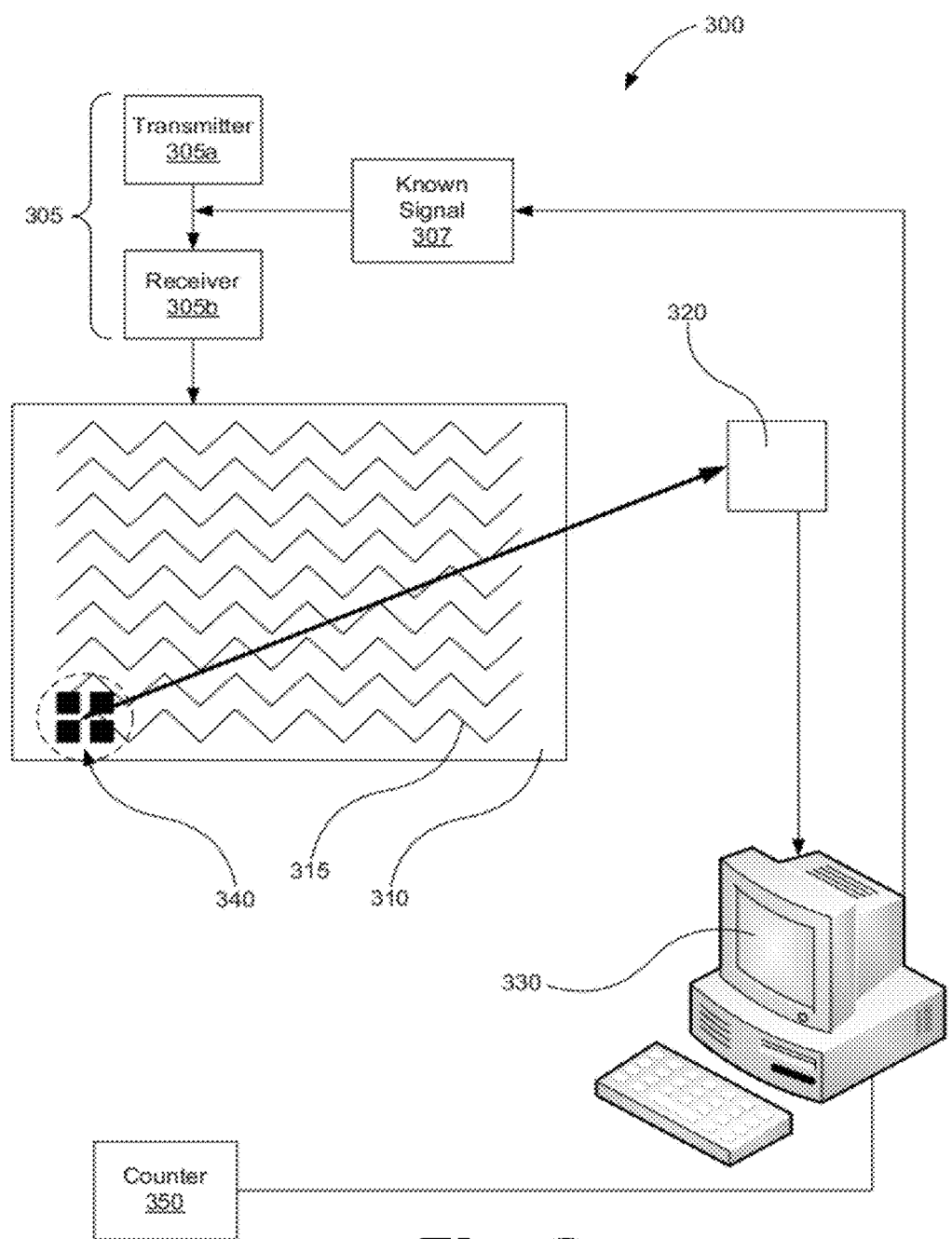
FIG. 3 is a block diagram of one example of a system for measuring video frame rates, according to yet another embodiment of the principles described herein.

FIG. 3 is a block diagram of one example of a system for measuring video frame rates, according to yet another embodiment of the principles described herein. The system (300) depicted in FIG. 3 may comprise a source (305) comprising a transmitter (305a) and a receiver (305b), and a display device (310) configured to display a number of frames (315) based on data input from the source (305). The system (300) may further comprise an imaging device (320) configured to capture a number of frames (315) displayed on the display device (310). The imaging device (320) may be in communication with to a computing device (330), in which the computing device (330) is configured to process the frames (315) captured by the imaging device (320). Further, the system (300) may comprise a counter (350) for use by the computing device (330) in counting the number of different frames output by the display device (310) and captured by the imaging device (320).

The system of FIG. 3 utilizes a photodetector (320). The photodetector (320) may be, for example: a photoresistor configured to change resistance according to light intensity; a solar cell configured to produce a voltage and supply an electric current when illuminated; a photodiode configured to convert light into either current or voltage, depending upon the mode of operation; a charge-coupled device (CCD), and combinations of these, among others.

In one example, the system (300) of FIG. 3 may include a number of photodetectors (320) arranged in an array. In this embodiment, if the source (305) has been augmented with the test signal (207) as described above in connection with FIG. 2, the system (300) does not need a video camera and associated image processing. In this embodiment, an array of photodetectors (320) may be in communication with an input of the computing device (330). If the photodetectors (320) are positioned in front of the display device (310) where the test pattern (340) will be displayed, and the outputs of the individual photodetectors (320) within the array are in communication with an input of the computing device (330), the resulting set of values can be processed more simply to determine the frame rate output by the display device (310).

Since the output of the source (305) (for example, digital or analog output) directly correlates to the value which the test pattern (340) represents, and the test pattern (340) is supposed to represent a differing value for each frame (for example, an increasing or decreasing, or following a known pattern), it is simple to determine if a frame or number of frames was/were dropped between the source (305) and output frames detected by the photodetectors (320). As before, dividing the number of different detected frames by the period of acquisition (for example, in seconds) allows for the calculation of the average frame rate (or the frame rate at any given point in time). The embodiment of FIG. 3 provides for a method of accurately calculating the frame rate output by the source (305) and/or the display device (310).

In addition to the system (300) depicted in FIG. 3 and described above, in one example, capture of the video output may be performed by an analog-to-digital converter (ADC) connected to a video graphics array (VGA) output. In another example, the photodetector or photodetectors may in communication with a general purpose input/output (GPIO), such as a parallel port, or an oscilloscope if the video has been augmented as described above.

Figure 4:
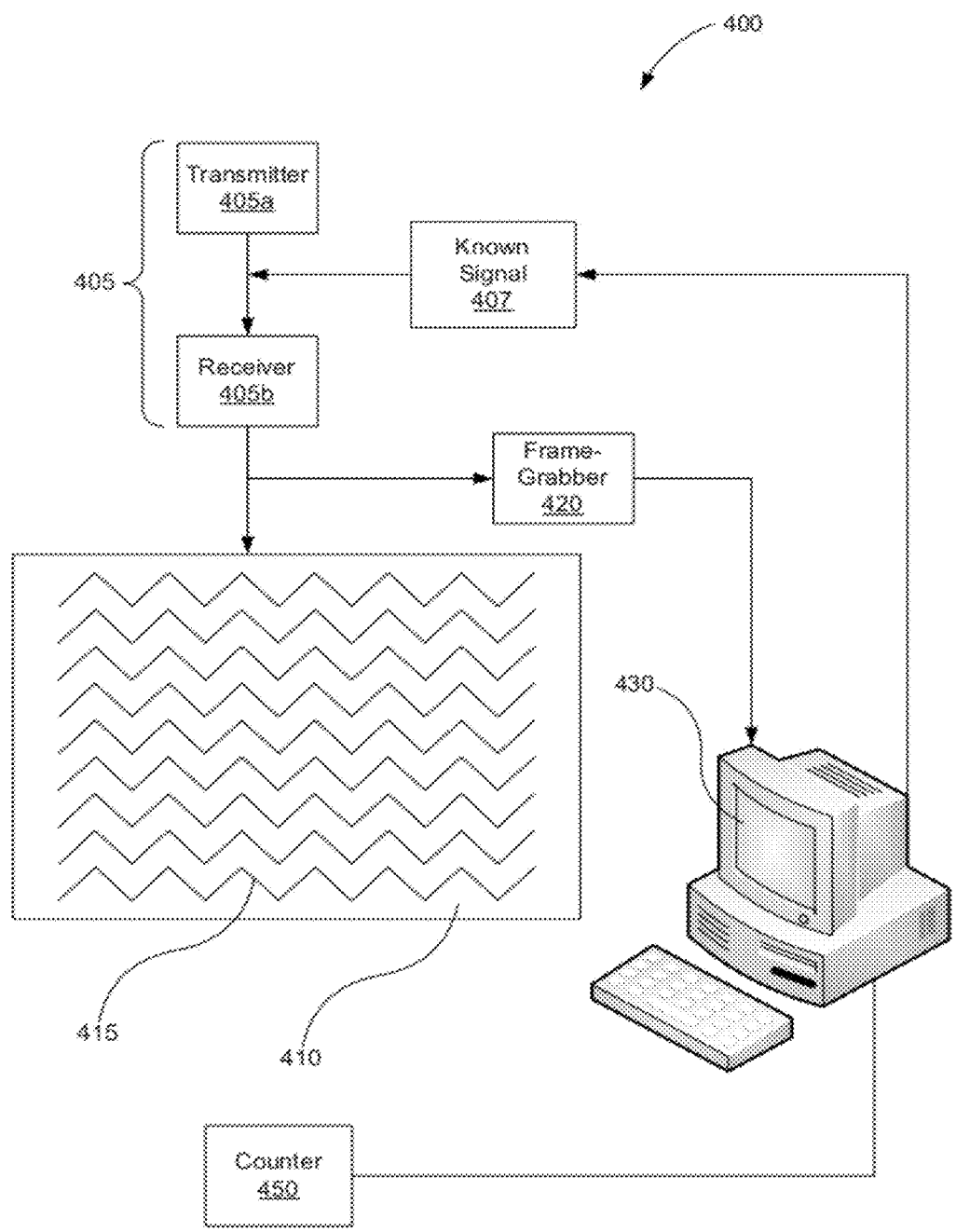
FIG. 4 is a block diagram of one example of a system for measuring video frame rates, according to still another embodiment of the principles described herein.

Next, FIG. 4 is a block diagram of one example of a system for measuring video frame rates, according to still another embodiment of the principles described herein. The system (400) depicted in FIG. 4 may comprise a source (405) comprising a transmitter (405a) and a receiver (405b), and a display device (410) configured to display a number of frames (415) based on data input from the source (405). Further, the system (400) may comprise a counter (450) for use by the computing device (430) in counting the number of different frames.

The system shown in FIG. 4 utilizes a frame-grabber (420) as the imaging device. The frame-grabber (420) is in communication with the source and may, in some examples, be electrically coupled directly to the output of the source.

As described above, a frame grabber (420) is any hardware, software, or combinations of hardware and software that capture individual, digital still frames from an analog video signal or a digital video stream output by the source (405). The output of the frame-grabber (420) may be in communication with the computing device (430). In this manner, the frame-grabber (420) captures individual frames output by the source (405), and, more specifically, the receiver (405b). These individual frames are then output to the computing device (430). As described in previous embodiments, the computing device (430) then determines if two consecutive images captured by the frame-grabber (420) are different. For each different image detected, the counter (450) is incremented. The computing device (430) then computes the frame rate by dividing the number indicated by the counter (450) by the duration (for example, in seconds) of the analyzed clip. Thus, the embodiment of FIG. 4 provides for an even simpler and cost efficient manner of determining the frame rate output from the source (405).

Figure 5:
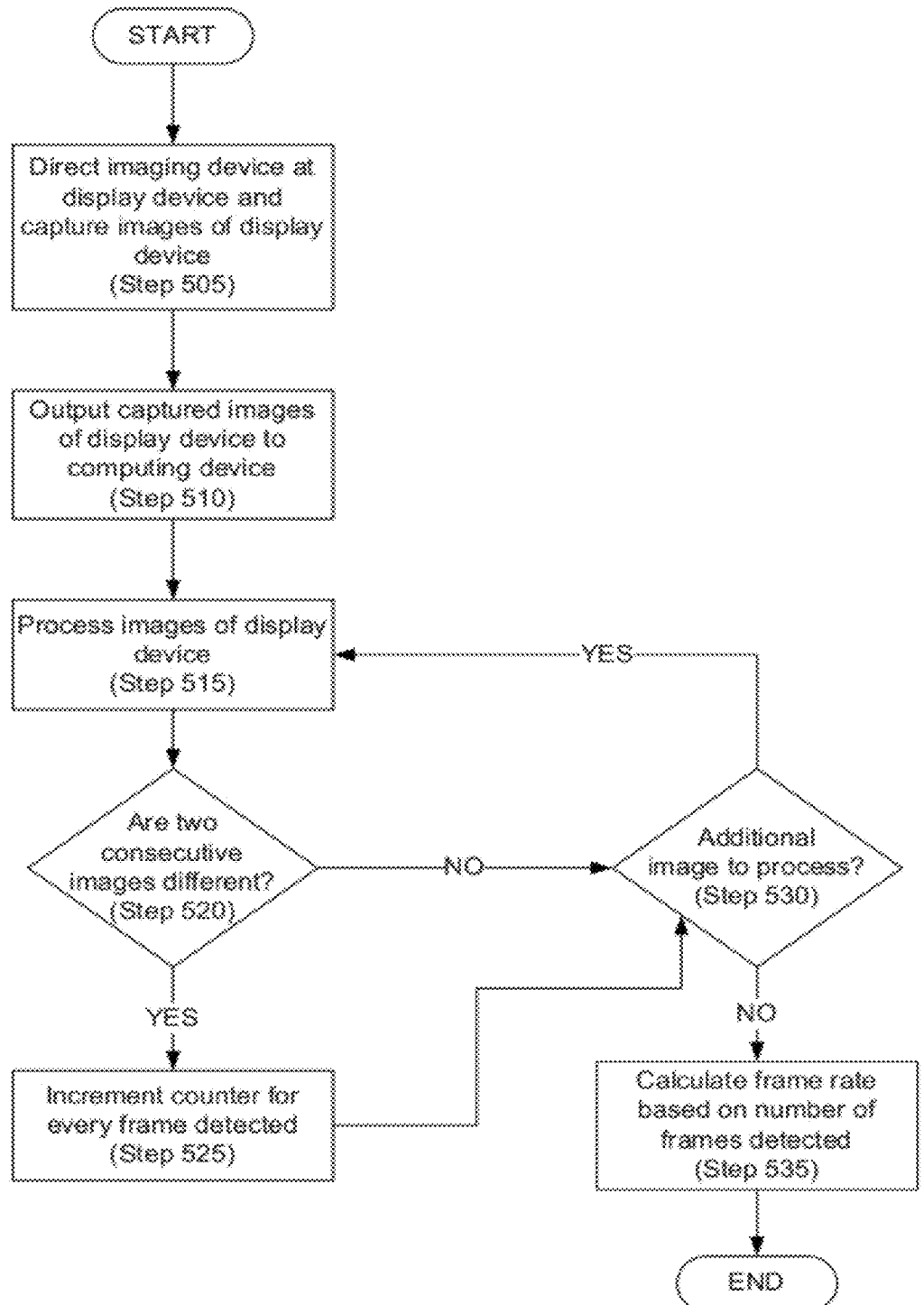
FIG. 5 is a flowchart illustrating one example of a method for measuring video frame rates, according to an embodiment of the principles described herein.

Turning now to FIG. 5, a flowchart illustrating a method of measuring video frame rates, according to an embodiment of the principles described herein is depicted. The method begins with directing an imaging device at a display device, and capturing a number of images of display device with the imaging device (505). In an embodiment using a frame-grabber, this is performed by capturing a number of images output from the receiver with the frame grabber. As discussed earlier, the imaging device may be configured to have a frame rate acquisition greater than the output frame rate of the display device or the source. Once the imaging device captures the images, the images are output to a computing device (510). Then, the images captured by the imaging device are processed (515). The computing device, and, more specifically, the processor (not shown) of the computing device determines whether two consecutive images captured by the imaging device are different (520). As discussed above, determining whether two consecutive images captured by the imaging device are different (520) may be performed by analyzing the data associated with consecutive images using an algorithm to determine if the data representing the consecutive images is different.

If the computing device determines that two consecutive images are the same (that is, the images are not different) (520, determination NO), then it is determined if additional images captured by the imaging device and output to the computing device need to be processed (530). In FIG. 5, 520 may be applied in determining if two consecutive images are the same, or if two consecutive test patterns are the same. If additional images need to be processed (530, determination YES), then the process loops back to 515, and the next two consecutive images are analyzed to determine if they are different (520). In one example, these next two consecutive images are the second image of the previous set of consecutive images analyzed and the next image after the second image of the previous set of images. In this manner, each image in the sequence of images is analyzed to determine whether a given image differs from its immediately preceding and immediately subsequent images. If additional images do not need to be processed (530, determination NO), then the frame rate is calculated (535) as will be described in more detail below.

If the computing device determines that two consecutive images are not the same (that is, the images are different) (520, determination YES), then the counter is incremented (525). The counter is incremented every time it is determined that two consecutive images differ (520, determination YES).

After a number of images captured by the imaging device are analyzed (515 through 525), the frame rate may be calculated based on the number of different frames detected as indicated by the counter (535). In one example, the number of images analyzed may be any number of images sufficient to determine the frame rate output by the source and/or the display device. For example, the system may be configured to analyze a set duration of video measured in seconds. Thus, by dividing the number of different frames acquired by the imaging device by the duration of the video clip in seconds, the frame rate in frames per second (fps) of the display device or output by the receiver may be determined.

Figure 6:
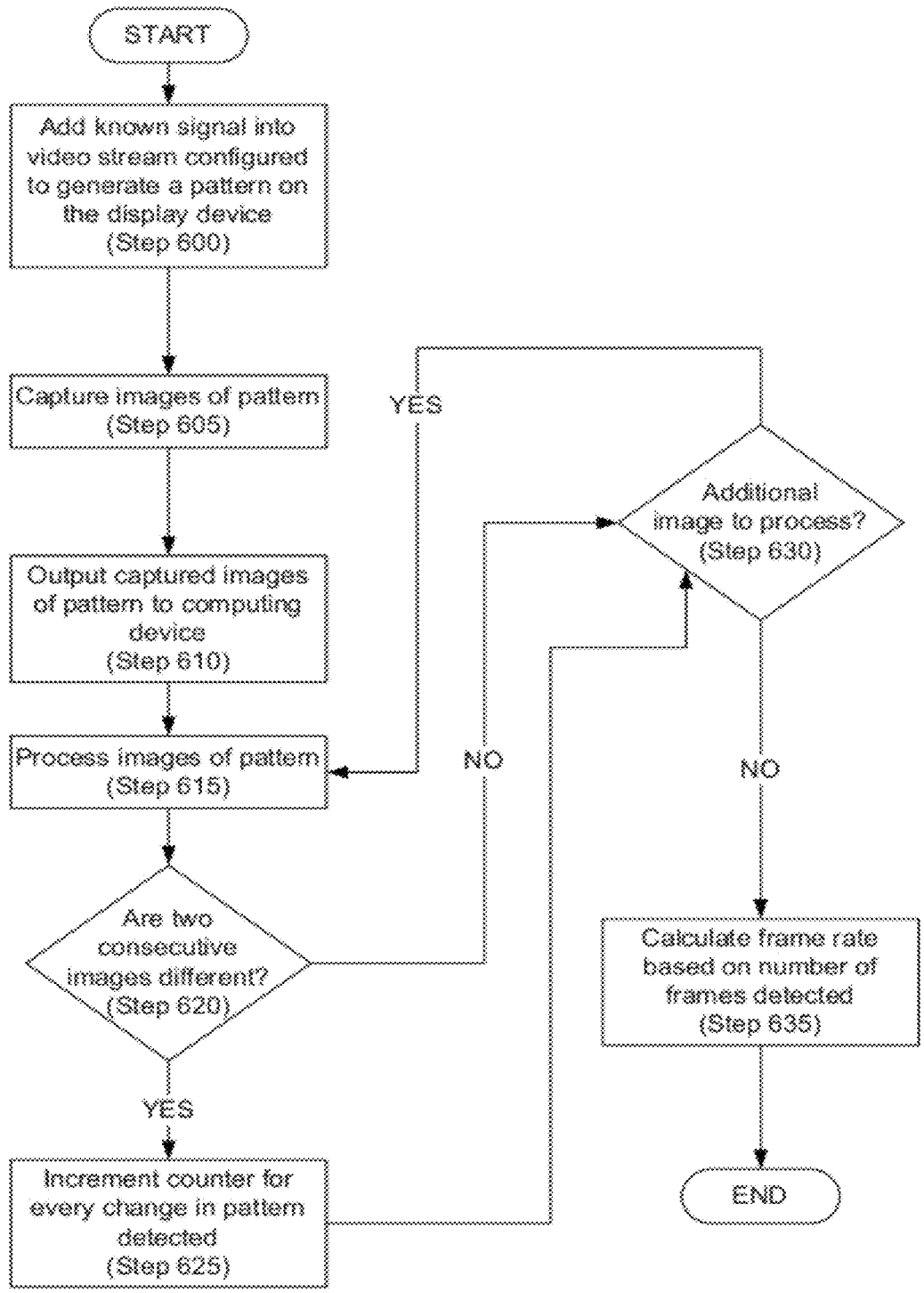
FIG. 6 is a flowchart illustrating one example of a method for measuring video frame rates, according to another embodiment of the principles described herein.

FIG. 6 is a flowchart illustrating a method of measuring video frame rates, according to another embodiment of the principles described herein. First, a test signal may be transmitted by the computing device and added or overlaid onto the video stream provided by the source, where the test signal generates a test pattern on the display device or otherwise combines with the source for analysis by a frame-grabber and computing device (600). Next, an imaging device may be directed at the test pattern on the display device or configured to receive the combined source and test signal (as in the case of the above-described embodiment including a frame-grabber), and a series of images may be captured by the imaging device (605).

Next, the images of the test pattern or the data collected by the frame-grabber are output to a computing device (610). Then, the images of the test pattern captured by the imaging device are processed (615). As described above, the computing device determines whether two consecutive images captured by the imaging device are different (620). If the computing device determines that two consecutive images are the same (that is, the images are not different) (620, determination NO), then it is determined if additional images captured by the imaging device and output to the computing device need to be processed (630). If additional images need to be processed (630, determination YES), then the process loops back to (615), and the next two consecutive images are analyzed to determine if they are different (620). If additional images do not need to be processed (630, determination NO), then the frame rate is calculated (635) as will be described in more detail below.

In one example in which the test patterns are detected by an imaging device, the values of the test pattern may be decoded directly as ones and zeros, and the current values may be compared to previous values to determine if the image changed. In one specific embodiment, the camera or photodetector may detect, for example, whether a change in intensity of a portion of the display device in the area the camera or photodetector is imaging occurred or not. In this embodiment, image processing is not required to determine if the image has changed or not. Simply looking for the number to change is sufficient. By knowing the expected sequence (for example, the Gray code), it is possible to tell if any frames were dropped.

If the computing device determines that two consecutive images of the test pattern are not the same (that is, the images are different) (620, determination YES), then the counter is incremented (625) each time the test pattern changes or a different frame is detected in the case of the embodiment depicted in FIG. 4. After a number of images captured by the imaging device are analyzed (615 through 625), the frame rate may be calculated based on the number of different test patterns or frames detected as indicated by the counter (635). As in previous embodiments, dividing the number of different frames acquired by the imaging device as indicated by the counter by the duration of the video clip in seconds, the frame rate in frames per second (fps) of the display device may be determined.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of frame rate measurement, comprising:
with an imaging device, capturing images of a number of frames of at least a portion of a series of frames output on a display device;
determining if consecutive images of the captured images are different,
in which, if consecutive images are different, then incrementing a counter; and
dividing the number indicated by the counter by a duration of the series of frames to produce a frame rate of a source of the series of frames output on the display device.

2. The method of claim 1, in which, if consecutive images of the captured images are not different, then determining if the next two consecutive images of the captured images are different, in which the next two consecutive images are the second image of the previous set of consecutive images and the next image after the second image of the previous set of consecutive images.

3. The method of claim 1, in which determining if consecutive images are different comprises applying a comparison algorithm to two consecutive images.

4. The method of claim 3, in which the comparison algorithm is at least one of an absolute error (AE) count algorithm; a mean absolute error (MAE) algorithm; a mean squared error (MSE) algorithm; a peak signal-to-noise ratio (PSNR) algorithm; a root mean squared error (RMSE) algorithm; a normalized sum of squared differences (root mean squared error) (NRMSE) algorithm; a normalized cross correlation algorithm; a histogram comparison algorithm; a hash algorithm; and time-frequency transform algorithms in which resulting coefficients are compared.

5. The method of claim 1, in which the imaging device captures an image at least twice as fast as a frame rate of the source.

6. The method of claim 1, in which the imaging device is at least one of a camera, a video camera, a web camera, and a photodetector.

7. The method of claim 1, further comprising:
adding a test signal to the series of frames, in which the test signal changes for each frame in the series of frames, the changes defining a pattern;
with the imaging device, capturing images of a number of frames of at least a portion of the series of frames;
determining if consecutive images of the captured images are different by detecting changes in the pattern;
incrementing a counter for each change in the pattern detected; and
dividing the number indicated by the counter by the duration of the series of frames.

8. A method of measuring frame rate comprising:
adding a test signal to the series of frames, in which the test signal changes for each frame in the series of frames, the changes defining a pattern;
with an imaging device, capturing images of a number of frames of at least a portion of the series of frames; and
detecting a number of different frames within the images by detecting changes in the pattern,
in which, if consecutive frames are different, then incrementing a counter; and
dividing the number indicated by the counter by a duration of the series of frames to produce a frame rate of a source of the series of frames output on the display device.

9. The method of claim 8, in which the imaging device is a frame-grabber, the method further comprising, with the frame-grabber, capturing images of a number of frames of at least a portion of the series of frames.

10. The method of claim 8, further comprising transmitting the combined test signal and series of frames to a display device, and, with the imaging device, capturing images of a number of frames of at least a portion of the series of frames as output by the display device.

11. A system for measuring frame rate, comprising:
a transmitter to transmit a series of frames;
a receiver to render the series of frames on a display device;
an imaging device to capture images of individual frames displayed on said display device within the series of frames; and
a computing device communicatively coupled to the imaging device for determining the frame rate at which frames are displayed on said display device based on the images of the frames captured by the imaging device,
in which the computing device:
determines if consecutive frames are different,
increments a counter if consecutive frames are different; and
divides the number indicated by the counter by a duration of the series of frames to produce a frame rate.

12. The system of claim 11, in which the display device is at least one of a liquid crystal display (LCD), a light-emitting diode (LED) display, an organic light emitting diode (OLEO) display, a plasma display panel, a televisions, a computer monitor, a high-definition television, and a cathode ray tube (CRT) display.

13. The system of claim 11, in which the imaging device comprises at least one of a photodiode, a photodetector, a photosensor, a light emitting diode (LED), a charge coupled device (CCO), and a solar cell.

14. The method of claim 8, in which the imaging device comprises at least one of photodiodes, photodetectors, and photosensors.

15. The system of claim 11, in which the imaging device captures an image at least twice as fast as a frame rate output by the receiver.

16. The system of claim 11, in which each frame of the series of frames is combined with a test signal, and in which the test signal changes for each frame in the series of frames, the changes defining a pattern, and
in which the computing device detects a number of different frames within the images by detecting changes in the pattern.

17. The system of claim 16, in which the imaging device is a frame-grabber directly coupled to the receiver.

18. The system of claim 16, in which the test signal is provided by at least one of the computing device, a separate computing device, and a standalone pattern generator.

19. The system of claim 16, further comprising a display device, in which the receiver renders the series of frames on the display device, and the imaging device captures images of the frames within the series of frames as output by the display device.

20. The method of claim 1, wherein said frame rate is a rate at which frames are displayed on said display device.

21. The method of claim 8, wherein said test signal indicates a number for each frame.

22. The method of claim 21, wherein said test signal includes a pattern of objects that changes for each frame and indicates a binary number.

23. The method of claim 8, wherein said imaging device images less than all of any frame and images only a portion of a frame that includes said added test signal, from which different frames are distinguished.

* * * * *

UNITED STATES PATENT AND TRADEMARK OFFICE
CERTIFICATE OF CORRECTION

PATENT NO. : 8,358,347 B2  
APPLICATION NO. : 12/858203  
DATED : January 22, 2013  
INVENTOR(S) : Christopher D. Voltz Page 1 of 1

It is certified that error appears in the above-identified patent and that said Letters Patent is hereby corrected as shown below:

In the Claims:

In column 13, line 12, in Claim 12, delete "(OLEO)" and insert -- (OLED) --, therefor.

In column 13, line 13, in Claim 12, delete "televisions," and insert -- television, --, therefor.

In column 13, line 19, in Claim 13, delete "(CCO)," and insert -- (CCD), --, therefor.

Signed and Sealed this  
Fourth Day of June, 2013

Teresa Stanek Rea  
*Acting Director of the United States Patent and Trademark Office*